May 4, 1926.
E. W. FARLEY
1,582,914
SEPTIC TANK
Filed July 28, 1922
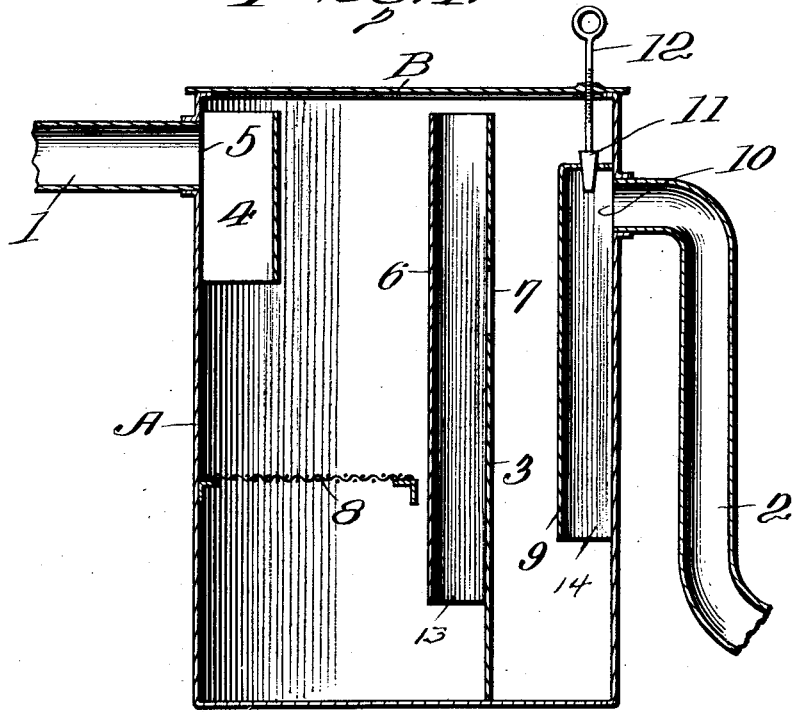
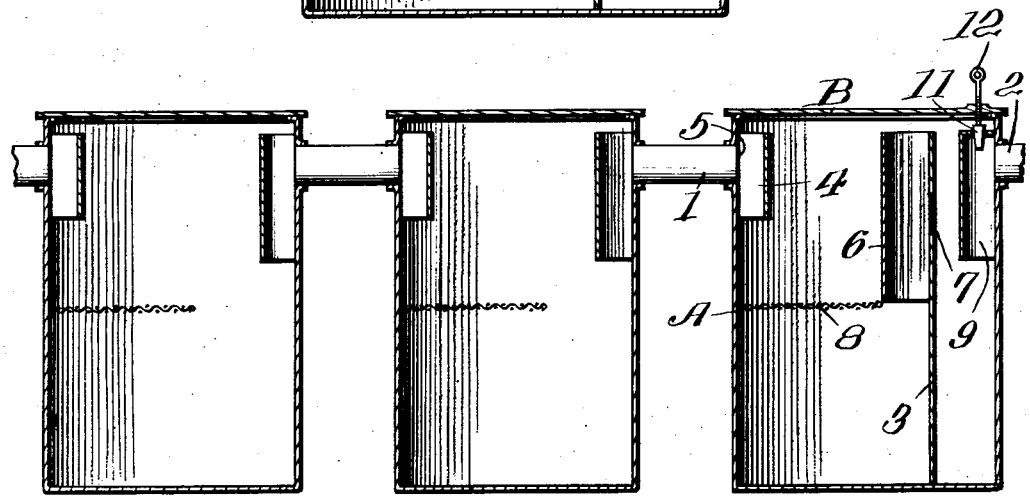
Inventor
Ernst W. Farley
By Arthur Scrivenor
Attorney Patented May 4, 1926.

1,582,914

UNITED STATES PATENT OFFICE.

ERNST W. FARLEY, OF RICHMOND, VIRGINIA.

SEPTIC TANK.

Application filed July 28, 1922. Serial No. 578,106.

*To all whom it may concern:*

Be it known that I, ERNST W. FARLEY, a citizen of the United States, residing at Richmond, in the county of Henrico and State of Virginia, have invented certain new and useful Improvements in Septic Tanks, of which the following is a specification, reference being had therein to the accompanying drawing.

This invention relates to septic tanks, and the object is to so improve known tanks of this character that all sewage of a house or other building may be more quickly and effectively disposed than heretofore. All sewage is filled with bacteria of various kinds and the function of these tanks is to dispose of all sewage by bacterial action. The bacteria under the conditions of my improved tank will cause the sewage to liquefy so that it may be taken up by the soil and changed into a harmless substance.

The invention will be hereinafter fully set forth and particularly pointed out in the claims.

In the drawings, Figure 1 is a vertical sectional view of my improved tank. Figure 2 is a view of a battery of tanks.

The tank is preferably constructed of a cylindrical drum A, having a removable top B. Near the top of the tank is an inlet pipe 1, and there is an outlet pipe 2 at a lower level and on the side of the tank opposite the inlet.

Within the tank between the inlet and outlet openings is a partition 3 which is located at one side of the center and closer to the outlet side of the tank, thereby dividing the tank into two compartments, and these I term receiving and discharge compartments. The partition 3 does not extend entirely to the top of the tank, but is slightly spaced therefrom to permit the gases to pass from one compartment to the other and to thus cause an equalization of the gas pressures.

A baffle 4 is positioned in front of the inlet opening 5 and extends a short distance below the level of the opening 5; the object of the baffle being to check any sudden and heavy flow of sewage into the tank which might unduly agitate the liquid and matter in the first or receiving compartment; and a further object being to cause the inflowing liquid to carry down and submerge incoming semi-solid matter or excreta.

A barrier plate 6 is located in the receiving compartment and has its side edges connected to the partition 3. The top of plate 6 is approximately on the same horizontal plane as the top of the partition 3, and extends downwardly nearly to the bottom of the tank. Between the plate 6 and partition 3 is formed a passage for carrying the liquid sewage from the receiving compartment to the discharge compartment of the tank by means of an opening 7 formed in the partition 3 near the top thereof, but below the level of the inlet pipe 1.

A screen 8 is removably supported in the receiving compartment to catch insoluble or solid matter heavier than the liquid, so making the said solid matter more accessible to the active bacteria.

A second barrier plate 9 has its edges and top connected to the wall of the tank and over the outlet opening 10 to form an outlet chamber, and to protect the surface of the liquid in the main discharge chamber from the disturbing effect of currents due to outflow from the tank. The plate 9 also may be made to form with the outlet pipe 2 a siphon for siphoning the liquid from the discharge compartment of the tank, by closing the valve 12 which is located in the top of the outlet chamber 14.

Sewage enters the tank by the pipe 1; flowing downward through the first or receiving compartment; entering at the bottom the still-chamber 13 formed between the partition 3 and the covering plate 6; passing through the opening 7 into the discharge compartment; then entering the bottom of the outlet chamber 14, and rising to the tank outlet 10, through which it passes to the pipe 2. The bottom edge of the inlet baffle plate 4 and the top of the opening 7 in the partition 3 are both below the outlet 10, and are consequently submerged except at such times as the liquid in the discharge compartment may be siphoned out, which is only the case at comparatively long intervals. There forms upon the surface of the liquid in the receiving compartment a scum of grease and other semi-solid matter which is attacked by the active bacteria. Heavier solids sink to the screen 8 where they also are readily attacked by the bacteria; and some may pass on to the bottom of the tank where their liquefaction will be somewhat slower than in the higher zones. As sewage enters the tank sometimes in heavy flushes, the baffle plate 4 protects the surface of the liquid in the receiving chamber from agitation; and plate 6 also protects this surface from the action of the currents passing through the opening 7 in plate 3. This quiet state of the liquid in the tank is important, as it is necessary for the desired bacterial action. The same quiet state exists in the discharge compartment because of the submergence of the opening 7 in plate 3, and because of the barrier plate 9 before the outlet 10 forming the outlet chamber 14.

My septic tank is specially useful in connection with what are known as irrigation beds, or tile beds, which consist of mains and branches of open tile laid about two feet underground and over a considerable area; and to which tile beds the liquefied sewage flows from the septic tank. This flow is usually only so great as the inflow of sewage to the tank; and when the inflow is small, the discharge may penetrate the tile bed to only a little distance. At times it is desirable to have a copious discharge from the tank to the tile bed, and to ensure the liquid reaching all parts of the system. This I accomplish by closing the valve 11, which converts the outlet chamber 14 and the pipe 2 into a siphon, through which the discharge compartment of the tank will be rapidly emptied. When the slow regular flow is desired it is only necessary to lift the valve 11, thus breaking the vacuum in the siphon.

In large installations where there is a large amount of sewage, more than one tank is required to afford the desired quiet period for the process of liquefaction. In such cases I use the battery arrangement shown in Figure 2. All of the tanks in a battery may be in construction like that shown in Figure 1; but I find it sufficient to use the simpler construction shown in Figure 2 for all tanks except the last one.

In my copending application Ser. No. 635,854, filed May 1, 1923, I claim septic tanks formed of copper steel alloys.

I claim as my invention:

1. A septic tank having an inlet opening and an outlet opening; a still-chamber adjacent the inlet opening; a baffle so arranged within the inlet opening as to cause entering liquid and solid matter to enter beneath the surface of the liquid in the still-chamber and also so as to allow entering gases to pass over it and over the surface of the liquid in the still-chamber; a shelf disposed below the inlet opening to receive solid matter in suspension in the liquid on the upper surface thereof, said shelf being arranged above the level of the bottom of the still chamber; a second still chamber adjacent the outlet opening and separated from the first still-chamber by a partition wall, the said partition wall having an opening at its upper end to allow the passage of gases and to equalize the gas pressures in the two still-chambers, and the said partition wall having in its surface an opening to form a communication between the two still-chambers, the said opening being below the surface of liquid in the still-chambers, and below the outlet opening from the tank; a baffle-plate disposed before the opening in the partition wall and arranged so as to form a third still-chamber within the tank to prevent movement in the liquid being imparted through the opening in the partition wall to the surface of the liquid in either of the other still-chambers, the upper end of the baffle-plate being above the surface of the liquid in the tank and arranged to allow an equalization of the gas pressures in the three still-chambers.

2. A septic tank having an inlet opening and an outlet opening; a still-chamber adjacent the inlet opening; a baffle so arranged within the inlet opening as to cause entering liquid and solid matter to enter beneath the surface of the liquid in the still-chamber and also so as to allow entering gases to pass over it and over the surface of the liquid in the still-chamber; a second still-chamber adjacent the outlet opening and separated from the first still-chamber by a partition wall, the said wall having an opening at its upper end to allow the passage of gases and to equalize the gas pressures in the two still-chambers, and the said partition wall having in its surface an opening at the upper central portion thereof to form a communication between the two still-chambers, the said opening being below the surface of the liquid in the still-chambers and below the outlet opening from the tank; a baffle-plate disposed before the opening in the partition wall and arranged so as to form a third still-chamber within the tank to prevent movement in the liquid being imparted through the opening in the partition wall to the surface of the liquid in either of the other still-chambers, the upper end of the baffle-plate being above the surface of the liquid in the tank and arranged to allow an equalization of the gas pressures in the three still-chambers.

3. A septic tank having inlet and outlet openings; a still-chamber adjacent the inlet opening; a baffle arranged within the inlet opening to direct entering liquid and solid matter beneath the surface of the liquid in the still-chamber and also permitting entering gases to pass over it and over the surface of the liquid in the still-chamber; a second still-chamber adjacent the outlet opening; a partition wall separating the first and the second still-chambers and spaced from the top plate of the tank to allow the equalization of the gas pressures in the two still-chambers and having in its surface an opening at the upper central portion thereof to form a communication between the two still-chambers, the said opening being below the surface of the liquid in the two still-chambers; a baffle plate disposed before the opening in the partition wall and arranged so as to form a third still-chamber within the tank to prevent movement of the liquid through the opening sufficient to disturb the surface of the liquid in either of the other still-chambers.

4. A septic tank having inlet and outlet openings; a still-chamber adjacent the inlet opening; a baffle arranged within the inlet to direct entering liquid and solid matter beneath the surface of the liquid in the still-chamber; a second still-chamber adjacent the outlet opening; a partition wall separating the first and second still chambers and spaced from the top plate of the tank to allow the equalization of the gas pressures in the two still-chambers and having in its surface an opening to form a communication between the two still-chambers and below the surface of the liquid in the still-chambers; a baffle plate disposed before the opening in the partition wall and arranged to form a third still-chamber within the tank to prevent movement of the liquid through the opening sufficient to disturb the surface of the liquid in either of the other still-chambers; a baffle arranged adjacent the outlet from the tank to form a siphon with the latter to flush the liquid from the tank; said siphon having an opening therein and a removable plug to open and close said opening.

5. A septic tank formed of copper-steel having an inlet chamber, an outlet chamber, a still chamber between the inlet and outlet chambers, a connecting passage from the inlet chamber to the bottom of the still chamber, and a submerged passage from the still chamber to the outlet chamber.

6. A septic tank formed of copper-steel, having an inlet opening and an outlet opening; a still chamber adjacent the inlet opening; a baffle so arranged within the inlet opening as to cause entering liquid and solid matter to enter beneath the surface of the liquid in the still chamber and also so as to allow entering gases to pass over it and over the surface of the liquid in the still chamber; a second still chamber adjacent the outlet opening and separated from the first still chamber by a partition wall, the said wall having an opening at its upper end to allow the passage of gases, and the said partition wall having a submerged opening in it to form a communication between the two still chambers; a baffle plate disposed before the submerged opening in the partition, and arranged so as to form a third still chamber within the tank to prevent movement of the liquid in the first still chamber being imparted to the surface of the liquid in the second still chamber; the upper end of the baffle plate being above the surface of the liquid in the tank but spaced from the cover of the tank to allow the passage of gases.

7. A septic tank for the treatment of sewage provided with a receiving compartment and a discharge compartment, a submerged communicating passage between the two compartments, a still chamber between the receiving compartment and the communicating passage, an inlet to the receiving compartment and an outlet from the discharge compartment.

8. A septic tank for the treatment of sewage provided with a partition disposed vertically in the tank and dividing it into two compartments, a submerged opening in the partition to form a communication between the two compartments, a still-chamber between the opening and the first compartment, an inlet to the first compartment, and an outlet from the second compartment.

9. A septic tank for the treatment of sewage provided with a receiving compartment and a discharge compartment, a submerged communicating passage between the two compartments, a still-chamber between the receiving compartment and the communicating passage, a submerged inlet to the receiving compartment, a submerged outlet from the discharge compartment, and a baffle plate disposed before the submerged communicating passage and terminating at a point below the submerged inlet.

In testimony whereof I have hereunto affixed my signature.

ERNST W. FARLEY.